(12) United States Patent
Lyu

(10) Patent No.: US 11,412,880 B2
(45) Date of Patent: Aug. 16, 2022

(54) DRINKING CONTAINER WITH FILTERING COVER

(71) Applicant: Haers HK Limited, Hong Kong (CN)

(72) Inventor: Lizhen Lyu, Hong Kong (CN)

(73) Assignee: Haers HK Limited, Hong Kong (CN)

( * ) Notice: Subject to any disclaimer, the term of this patent is extended or adjusted under 35 U.S.C. 154(b) by 308 days.

(21) Appl. No.: 16/878,630

(22) Filed: May 20, 2020

(65) Prior Publication Data

US 2021/0361107 A1    Nov. 25, 2021

(51) Int. Cl.
  *A47J 31/00* (2006.01)
  *A47G 19/22* (2006.01)
  *A47J 31/20* (2006.01)

(52) U.S. Cl.
  CPC ............ *A47J 31/005* (2013.01); *A47G 19/22* (2013.01); *A47J 31/20* (2013.01)

(58) Field of Classification Search
  CPC ...................................................... A47G 19/22
  See application file for complete search history.

(56) References Cited

U.S. PATENT DOCUMENTS

| | | | | |
|---|---|---|---|---|
| 2013/0186280 A1* | 7/2013 | Sekiguchi | ............. | A47J 31/005 99/287 |
| 2017/0042366 A1* | 2/2017 | Beckman | ................ | A23F 5/262 |
| 2017/0265674 A1* | 9/2017 | Liu | .......................... | A47J 31/20 |
| 2017/0280919 A1* | 10/2017 | He | ........................... | A47J 31/44 |
| 2018/0263403 A1* | 9/2018 | Richardson | ............ | A47J 31/005 |
| 2019/0191913 A1* | 6/2019 | Richardson | ........... | A47J 31/005 |
| 2019/0274457 A1* | 9/2019 | Robertson | ............. | A47J 31/005 |
| 2020/0093313 A1* | 3/2020 | Larsen | ................ | A47J 41/0072 |
| 2020/0305632 A1* | 10/2020 | Kubersky | ........... | A47J 31/0626 |
| 2020/0359826 A1* | 11/2020 | Umana | .................... | A47J 31/10 |
| 2022/0125234 A1* | 4/2022 | Richardson | ............... | A23F 5/26 |

* cited by examiner

*Primary Examiner* — Omar Flores Sanchez
(74) *Attorney, Agent, or Firm* — PROI Intellectual Property US; Klaus Michael Schmid

(57) ABSTRACT

A drinking container with filtering cover comprises a cup cover component, an inner plug component, a cup body, and a bottom cover component. A first accommodating space is formed in the cup body; the inner plug component seals the first accommodating space; the cup cover component is connected with the cup body; the bottom cover component is connected to the lower part of the cup body; the bottom cover component comprises a bottom cover and a filtering mesh cover. A second accommodating space is provided in the bottom cover; the filtering mesh cover is placed in the second accommodating space. A third accommodating space is provided in the filtering mesh cover; a filtering mesh member is provided on the filtering mesh cover; and the filtering mesh cover is rotatably connected with a folding supporting component and forms an accommodating position and a supporting position by rotating the folding supporting component.

10 Claims, 9 Drawing Sheets

DRINKING CONTAINER WITH FILTERING COVER

TECHNICAL FIELD

The present invention relates to a drinking container, in particular to a drinking container with a filtering cover.

BACKGROUND

With the improvement of people's consumption level and quality of life, outdoor activities have become an effective means for people to reduce fatigue and reduce blood pressure after tea and meals, so that the drinking container that can be carried about has become an indispensable choice for people to supplement moisture and nutrition during outdoor activities.

At present, the drinking containers on the market have a simple function, which are only used to hold liquids and lack a filtering device for filtering impurities. When people use drinking containers to brew various types of brewing products such as self-ground coffee and tea, different brewing devices are required, such as coffee machines, tea cups, etc.; the device such as a coffee machine for brewing self-ground coffee is generally not portable, so that existing drinking containers can only brew instant coffee and drip bag coffee, and people cannot really enjoy coffee outdoors. When an existing drinking container is used to brew tea and other brewed products, tea and other brewed products are generally placed directly in the drinking container for brewing, resulting in the situation that tea or other brewed products cannot be separated from the liquid, affecting the drinking taste and experience, and bringing inconvenience to the user. In order to realize the function of filtering tea, a filtering mesh or a removable filtering mesh is generally fixedly provided inside the container. However, this filtering mesh will occupy the space of the drinking container itself on the one hand, so that the tea in the drinking container is always in the brewing state. The concentration of beverages such as tea that cannot be brewed for a long time will be too high after being soaked for a long time, which is not conducive to ensuring the drinking taste of beverages. On the other hand, it will increase the difficulty of cleaning the filtering mesh, and its filtering effect is poor. In addition, the existing drinking container cannot achieve the purpose of brewing and enjoying various brewing products such as self-ground coffee and tea on the same drinking container.

In addition, the existing drinking container also lacks space for storing tea and other brewing products, which is not conducive to improving the portability of the drinking container and needs to be improved.

SUMMARY

The present invention provides a new drinking container with a filtering cover in view of the defects in the prior art that the drinking container has a single brewing object, poor beverage brewing taste, and poor filtering effect.

In order to solve the above technical problems, the present invention is implemented by the following technical solutions:

A drinking container with a filtering cover comprises a cup cover component, an inner plug component, a cup body, and a bottom cover component, wherein a first accommodating space is formed in the cup body, the inner plug component is connected with the cup body and seals the first accommodating space, the cup cover component is connected with the cup body, the bottom cover component is connected to the lower part of the cup body, wherein the bottom cover component comprises a bottom cover and a filtering mesh cover, a second accommodating space is provided in the bottom cover, the filtering mesh cover is placed in the second accommodating space, a third accommodating space is provided in the filtering mesh cover, a filtering mesh member communicated with the third accommodating space is provided on the filtering mesh cover, the filtering mesh cover is rotatably connected with a folding supporting component and forms an accommodating position and a supporting position by rotating the folding supporting component, at the supporting position, the folding supporting component expands outward and supports the filtering mesh cover, and at the accommodating position, the folding supporting component contracts inward and is accommodated on the filtering mesh cover.

The cup cover component can be used to hold beverages in the cup body, and the inner plug component is used to screw the rim of the cup body to seal the first accommodating space of the cup body. The first accommodating space is used to accommodate various beverages such as coffee, tea, water and the like. The bottom cover component is located at the lower part of the cup body, which can expand the use space of the drinking container and can store more beverages. The filtering mesh cover is used to filter various beverages, and can also be used to store various brewed products when not in use. The bottom cover is used in conjunction with the filtering mesh cover. The second accommodating space provided inside the bottom cover is used to place the filtering mesh cover, and can also hold the liquid filtered from the filtering mesh cover. The folding supporting component provided on the filtering mesh cover is used to support the filtering mesh cover, so that the filtering mesh cover is placed on the bottom cover by the folding supporting component, without the need for a general filtering mesh cover to be embedded in the cup body, so that the filtering mesh cover is used more freely and flexibly. In addition, according to different brewing beverages, the filtering mesh member on the filtering mesh cover can also be detached from the filtering mesh cover, so as to replace the filtering meshing member with different meshes to meet the filtering needs of various beverages. During use, the user can tear the package of the brewed product and place the brewed products such as coffee and tea in the cup cover component, then pour the clean water in the cup body, and then pour the brewed beverage in the cup cover component into the filtering mesh cover. The filtering mesh cover will filter out the filter residue in the beverage, so that the beverage filtered into the bottom cover does not have impurities any longer.

Through the cooperation between the cup cover component, the inner plug component, the cup body, the bottom cover, and the filtering mesh cover, the present invention further increases the storage and use space of the drinking container on the one hand, and can effectively remove the impurities in the beverage through the filtering function of the filtering mesh cover on the other hand. Moreover, the folding and supporting functions of the folding supporting component enable the filtering mesh cover itself to be firmly supported on the objects such as the bottom cover or the cup cover component, unlike the traditional filtering mesh cover which must be embedded inside the cup body, which greatly improves the freedom of use of the filtering mesh cover, enables users to have more choices during use, and is capable of brewing and filtering beverages such as coffee and tea well, and satisfying people's daily needs well.

Preferably, in the above drinking container with a filtering cover, the folding supporting component comprises at least two folding brackets and a rotating ring, the rotating ring is rotatably connected to the filtering mesh cover, one end of the folding bracket is connected to the side wall of the filtering mesh cover, and the other end of the folding bracket is connected to the rotating ring, a bending part is provided on the folding bracket, the rotating ring drives the other end of the folding bracket to slide to form the accommodating position and the supporting position during rotation, when the folding bracket is at the supporting position, the bending part expands outward and supports the filtering mesh cover, and when the folding bracket is at the accommodating position, the bending part contracts inwardly and is accommodated on the filtering mesh cover.

The folding bracket is used to support the filtering mesh cover on the bottom cover when the folding supporting component forms a supporting position, which is convenient for the user to pour the beverage into the filtering mesh cover to filter, so as to pour the filtered beverage into the bottom cover. One end of the folding bracket is connected to the filtering mesh cover, and the other end thereof is connected to the rotating ring. The user only needs to rotate the rotating ring to drive the folding bracket to switch between the accommodating position and the supporting position, which improves the convenience of use. The folding bracket can quickly form the supporting position and the accommodating position through its own bending and unfolding of the bending part of the folding bracket, which can improve the use efficiency of the folding bracket.

Preferably, in the above drinking container with a filtering cover, one end of the folding bracket is provided with a connecting hole, a connecting rib cooperated with the connecting hole is provided at the side wall of the filtering mesh cover, and one end of the folding bracket is connected to the filtering mesh cover through the connecting hole and the connecting rib.

The connecting hole provided at one end of the folding bracket is used to be clamped to the connecting rib provided on the side wall of the filtering mesh cover and connects one end of the folding bracket to the filtering mesh cover, improving the tightness of the connection between the folding bracket and the filtering mesh cover, preventing the folding bracket from being loosened by pulling one end of the folding support during folding and storage, thereby ensuring the stability of the folding supporting component structure and retaining the supporting effect of the folding bracket.

Preferably, in the above drinking container with a filtering cover, the other end of the folding bracket is provided with a clamping protrusion, a neck cooperated with the clamping protrusion is provided on the rotating ring, a barb is provided at the bottom of the clamping protrusion, the barb is clamped into the inner wall of the neck, and the other end of the folding bracket is connected to the rotating ring through the neck and the clamping protrusion.

The clamping protrusion provided on the other end of the folding bracket is clamped with the neck provided on the rotating ring, and the other end of the folding bracket is connected with the rotating ring, so that the rotating ring can drive the other end of the folding bracket to rotate to realize the folding and accommodating of the folding bracket by rotation. The barb provided at the bottom of the clamping protrusion is used to be clamped to the inner wall of the neck to enhance the tightness of clamping between the clamping protrusion and the neck, thereby further improving the driving effect of the rotating ring on the other end of the folding bracket.

Preferably, in the above drinking container with a filtering cover, the bending part is further provided with a bending auxiliary groove.

During the folding process of the folding bracket, the bending part will have a large deformation, resulting in a large elastic potential energy and preventing the bending part from further bending. In this way, the folding bracket is folded more laboriously, and during long-term use, there will also be a great loss on the folding bracket. The bending auxiliary groove provided on the bending part is used to assist the bending part in bending. The bending auxiliary groove is thinner than the bending part, and it is easier to bend and fold, thereby reducing the elastic potential energy generated by the bending part during folding and bending, so that it is smoother to fold and bend. At the same time, the pressure on the bending part can be reduced when bending, thereby extending the service life of the folding bracket.

Preferably, in the above drinking container with a filtering cover, the number of the bending auxiliary grooves is three, wherein one bending auxiliary groove is located inside the middle part of the bending part, and the remaining two bending auxiliary grooves are located outside the end of the bending part.

When the bending part is folded, because both ends of the folding bracket are fixed on the side wall of the filtering mesh cover and the rotating ring, the bending part will be folded outside the end. At this time, a bending auxiliary groove is provided at the folding part, improving the folding flexibility, preventing the outside of the bending part from breaking due to long-term folding, and reducing the resistance to folding. The bending auxiliary groove provided inside the middle of the bending part can improve the flexibility of the middle of the bending part and reduce the folding resistance here, so that the folded bending part is more stable, thereby further improving the supporting stability of the folding bracket.

Preferably, in the above drinking container with a filtering cover, a limiting rib is provided inside the rotating ring, the filtering mesh cover is provided with a first limiting slot and a second limiting slot cooperated with the limiting rib, when the folding bracket is at the accommodating position, the limiting rib is clamped into the first limiting slot, and when the folding bracket is at the supporting position, the limit rib is clamped into the second limiting slot.

The limiting rib provided inside the rotating ring is used to be clamped into the first limiting slot and the second limiting slot during rotation, so that when the folding supporting component forms the accommodating position and the supporting position, the position of the rotating ring can be limited one the one hand, ensuring the stability of the folding supporting component at the accommodating position and the supporting position. On the other hand, the clamping state is formed, which can also prompt the user to rotate the rotating ring, remind the user that the rotating ring has been rotated into place, and improve the use experience.

Preferably, in the above drinking container with a filtering cover, the number of the folding brackets is three.

The number of folding brackets is set as three, which can reduce the processing cost and processing complexity under the premise of satisfying the supporting stability of the folding bracket.

Preferably, in the above drinking container with a filtering cover, strip-shaped ribs are provided on the inner wall of the bottom cover, the number of the strip-shaped ribs is at least two, the strip-shaped ribs are uniformly distributed on the inner wall of the bottom cover, point-shaped protrusions cooperated with the strip-shaped ribs are provided in the lower part of the cup body, and when the bottom cover is connected to the cup body, the point-shaped protrusions are located below the strip-shaped ribs and limit the bottom cover to move up and down.

The strip-shaped ribs provided on the inner wall of the bottom cover are used to cooperate with the point-shaped protrusions provided in the lower part of the cup body. When the bottom cover is mounted to the lower part of the cup body, the strip-shaped ribs are clamped with the point-shaped protrusions to limit the bottom cover to move up and down, strengthening the tightness of the connection between the bottom cover and the cup body.

Preferably, in the drinking container with a filtering cover, the bottom cover component further comprises a built-in accommodating cup, the built-in accommodating cup is placed in the third accommodating space, the built-in accommodating cup comprises an inner compartment body and an inner compartment cover, a fourth accommodating space is formed in the inner compartment body, and the inner compartment cover covers the inner compartment body.

The built-in accommodating cup is used to place the brewing products and store the brewing products. The inner compartment body is used to form a fourth accommodating space, so as to place the brewing products. The inner compartment cover is used to cover the inner compartment body to seal the fourth accommodating space, ensuring the tightness of the storage of the brewed products, thereby further improving the portability of the present invention.

DESCRIPTION OF THE EMBODIMENTS

Figure 1:
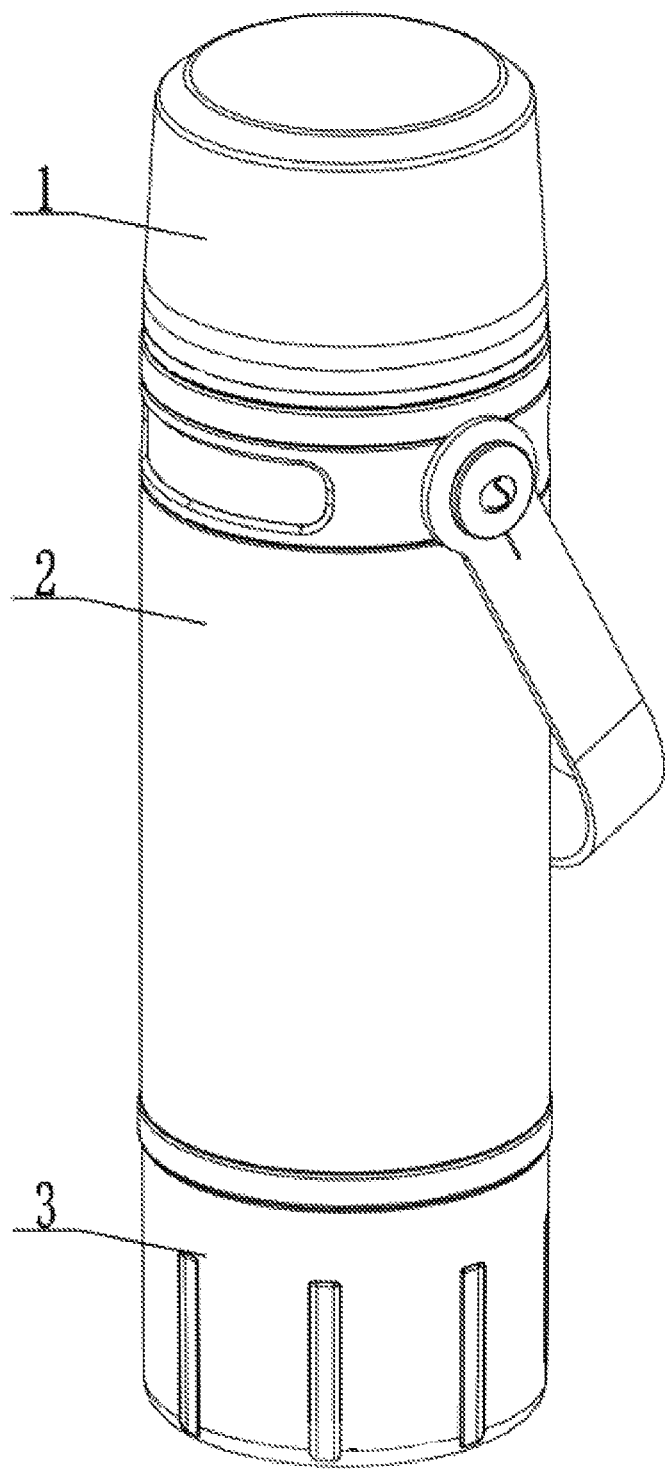
FIG. 1 is a schematic structural diagram of the present invention.
Figure 2:
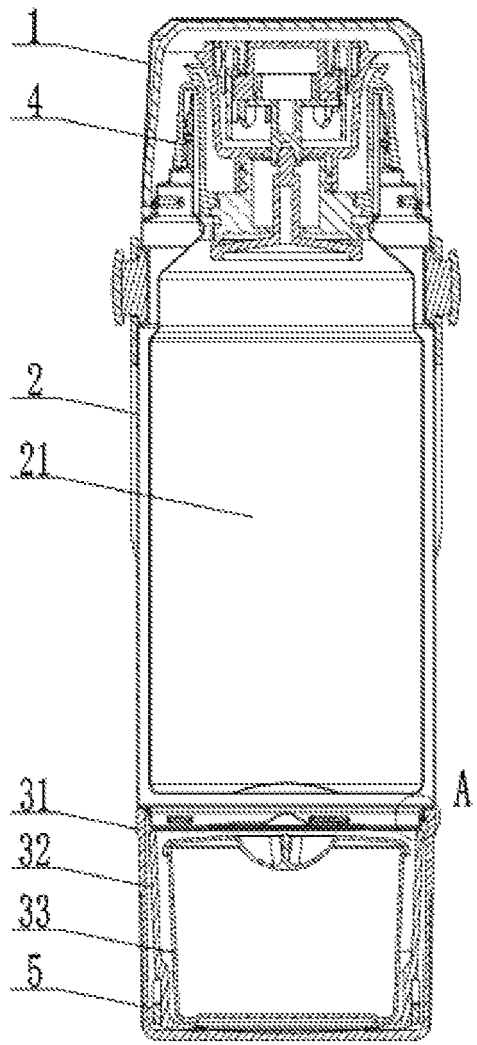
FIG. 2 is a cross-sectional diagram of the present invention.
Figure 3:
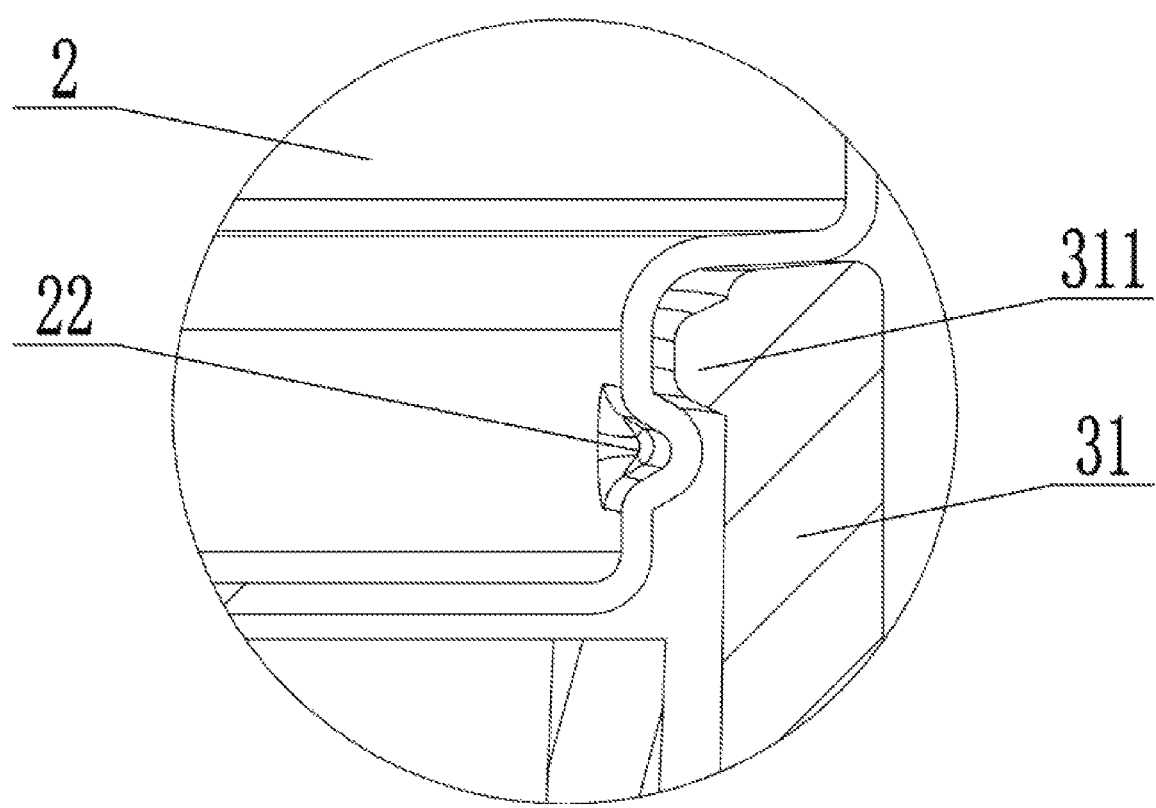
FIG. 3 is a partial enlarged diagram of part A in FIG. 2.

The present invention will be described in further detail below with reference to FIGS. 1-9 and specific embodiments, rather than limit the present invention:

Embodiment 1

A drinking container with a filtering cover comprises a cup cover component 1, an inner plug component 4, a cup body 2, and a bottom cover component 3, wherein a first accommodating space 21 is formed in the cup body 2, the inner plug component 4 is connected with the cup body 2 and seals the first accommodating space 21, the cup cover component 1 is connected with the cup body 2, the bottom cover component 3 is connected to the lower part of the cup body 2, wherein the bottom cover component 3 comprises a bottom cover 31 and a filtering mesh cover 32, a second accommodating space 312 is provided in the bottom cover 31, the filtering mesh cover 32 is placed in the second accommodating space 312, a third accommodating space 321 is provided in the filtering mesh cover 32, a filtering mesh member 325 communicated with the third accommodating space 321 is provided on the filtering mesh cover 32, the filtering mesh cover 32 is rotatably connected with a folding supporting component 5 and forms an accommodating position and a supporting position by rotating the folding supporting component 5, at the supporting position, the folding supporting component 5 expands outward and supports the filtering mesh cover 32, and at the accommodating position, the folding supporting component 5 contracts inward and is accommodated on the filtering mesh cover 32.

During use, the user first opens the cup cover component 1 and the inner plug component 4, injects clean water into the first accommodating space 21 of the cup body 2, and then connects the inner plug component 4 and the cup cover component 1 to the cup body 2 in sequence. Next, the bottom cover component 3 is detached from the lower part of the cup body 2, the brewed product is placed in the third accommodating space 321 in the filtering mesh cover 32, and then the bottom cover component 3 is connected to the lower part of the cup body 2. At this time, the entire drinking container can be carried out.

When drinking is needed, the brewed product can be taken out from the third accommodating space 321 of the filtering mesh cover 32, the outer package of the brewed product is torn, and the brewed product is put into the cup cover component 1. Then clean water in the cup body 2 is poured for brewing, and the brewed product here may be tea, self-ground coffee, or other brewed products.

When brewing tea, the user pours clean water into the cup cover component 1 where the tea is placed and let it sit for a while. The folding supporting component 5 on the filtering mesh cover 32 is then adjusted from the accommodating position to the supporting position, and then the filtering mesh cover 32 is placed on the bottom cover 31 by the folding supporting component 5 at the supporting position, so that the filtering mesh cover 32 is supported on the mouth of the bottom cover 31. After the tea is brewed to generate tea soup, the tea, tea soup, etc., in the cup cover component 1 are poured into the third accommodating space 321 of the filtering mesh cover 32, and then are filtered through the filtering mesh member 325. The tea soup flows into the second accommodating space 312 of the bottom cover 31 along the filtering mesh member 325, and the tea and impurities will be left in the third accommodating space 321 of the filtering mesh cover 32, thus completing filtering tea soup. At this time, the user removes the filtering mesh cover 32, and the user can directly drink the tea soup in the bottom cover 31.

When the brewed product is self-ground coffee, the user first puts the self-ground coffee into the cup cover component 1, and pours clean water for stirring. After fully stirring, the folding supporting component 5 of the filtering mesh cover 32 is switched to the supporting position and supports the filtering mesh cover 32 at the mouth of the bottom cover 31. The liquid in the cup cover component 1 is poured into the third accommodating space 321 of the filtering mesh cover 32, and is filtered through the filtering mesh member

325. The coffee flows into the bottom cover 31 along the filtering mesh member 325 to complete the filtering of coffee. In order to improve the filtering effect of the self-ground coffee, the user can further place a layer of filter paper on the filtering mesh member 325 and then filter the coffee.

In addition, according to different characteristics of different beverages, the user can replace the filtering mesh 325 of different meshes according to different beverages in actual use, so as to better satisfy the filtering needs of different beverages.

Preferably, the folding supporting component 5 comprises at least two folding brackets 51 and a rotating ring 52, the rotating ring 52 is rotatably connected to the filtering mesh cover 32, one end of the folding bracket 51 is connected to the side wall of the filtering mesh cover 32, and the other end of the folding bracket 51 is connected to the rotating ring 52, a bending part 53 is provided on the folding bracket 51, the rotating ring 52 drives the other end of the folding bracket 51 to slide to form the accommodating position and the supporting position during rotation, when the folding bracket 51 is at the supporting position, the bending part 53 expands outward and supports the filtering mesh cover 32, and when the folding bracket 51 is at the accommodating position, the bending part 53 contracts inwardly and is accommodated on the filtering mesh cover 32.

Preferably, one end of the folding bracket 51 is provided with a connecting hole 513, a connecting rib 322 cooperated with the connecting hole 513 is provided at the side wall of the filtering mesh cover 32, and one end of the folding bracket 51 is connected to the filtering mesh cover 32 through the connecting hole 513 and the connecting rib 322.

Preferably, the other end of the folding bracket 51 is provided with a clamping protrusion 511, a neck 522 cooperated with the clamping protrusion 511 is provided on the rotating ring 52, a barb 512 is provided at the bottom of the clamping protrusion 511, the barb 512 is clamped into the inner wall of the neck 522, and the other end of the folding bracket 51 is connected to the rotating ring 52 through the neck 522 and the clamping protrusion 511.

Preferably, the bending part 53 is further provided with a bending auxiliary groove 54.

Preferably, the number of the bending auxiliary grooves 54 is three, wherein one bending auxiliary groove 54 is located inside the middle part of the bending part 53, and the remaining two bending auxiliary grooves 54 are located outside the end of the bending part 53.

Preferably, a limiting rib 521 is provided inside the rotating ring 52, the filtering mesh cover 32 is provided with a first limiting slot 323 and a second limiting slot 324 cooperated with the limiting rib 521, when the folding bracket 51 is at the accommodating position, the limiting rib 521 is clamped into the first limiting slot 323, and when the folding bracket 51 is at the supporting position, the limit rib 521 is clamped into the second limiting slot 324.

Preferably, the number of the folding brackets 51 is three.

Preferably, strip-shaped ribs 311 are provided on the inner wall of the bottom cover 31, the number of the strip-shaped ribs 311 is at least two, the strip-shaped ribs 311 are uniformly distributed on the inner wall of the bottom cover 31, point-shaped protrusions 22 cooperated with the strip-shaped ribs 311 are provided in the lower part of the cup body 2, and when the bottom cover 31 is connected to the cup body 2, the point-shaped protrusions 22 are located below the strip-shaped ribs 311 and limit the bottom cover 31 to move up and down.

Preferably, the bottom cover component 3 further comprises a built-in accommodating cup 33, the built-in accommodating cup 33 is placed in the third accommodating space 321, the built-in accommodating cup 33 comprises an inner compartment body 332 and an inner compartment cover 331, a fourth accommodating space 333 is formed in the inner compartment body 332, and the inner compartment cover 331 covers the inner compartment body 332.

More specifically, before going out, the user may inject boiling clean water into the first accommodating space 21 of the cup body 2 first, and screw the inner plug component 4 and the cup cover component 1 for heat preservation. According to requirements, one or more kinds of brewing product packages are placed in the inner compartment body 332 of the built-in accommodating cup 33, and the inner compartment cover 331 is screwed to seal.

Figure 6:
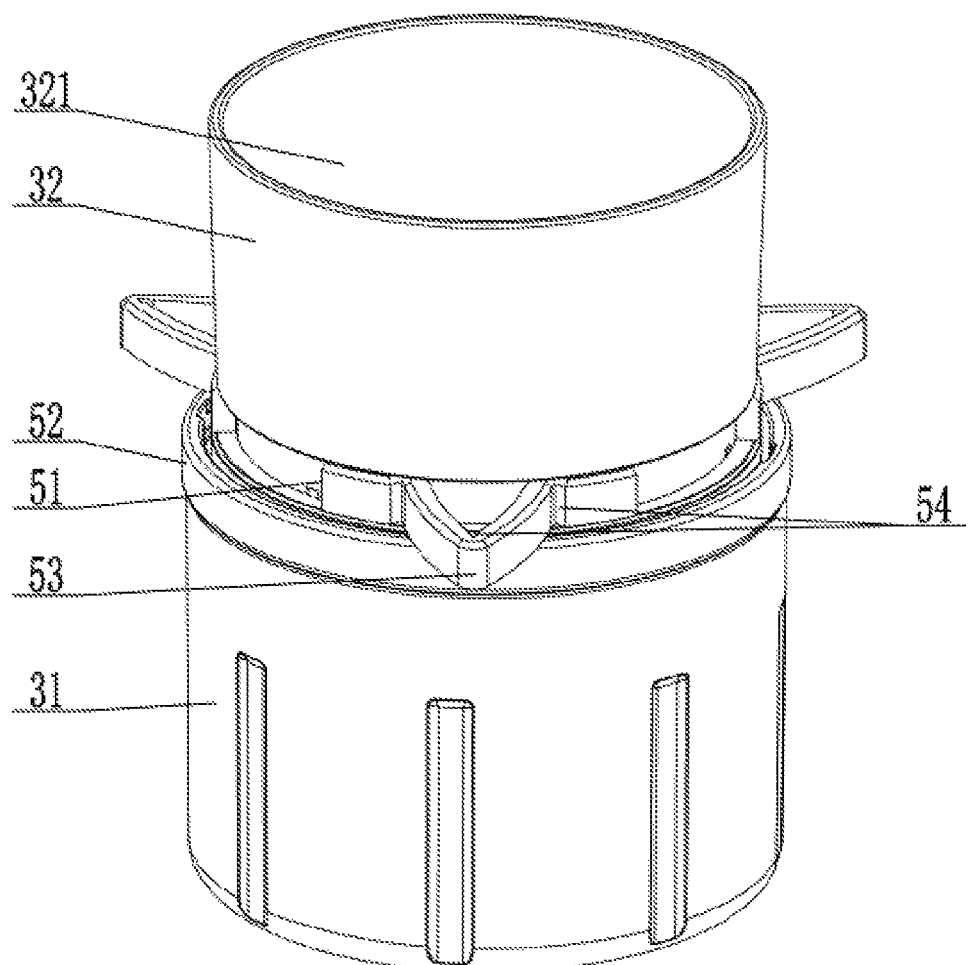
FIG. 6 is a schematic structural diagram of a folding supporting component according to the present invention when being at the supporting position.
Figure 7:
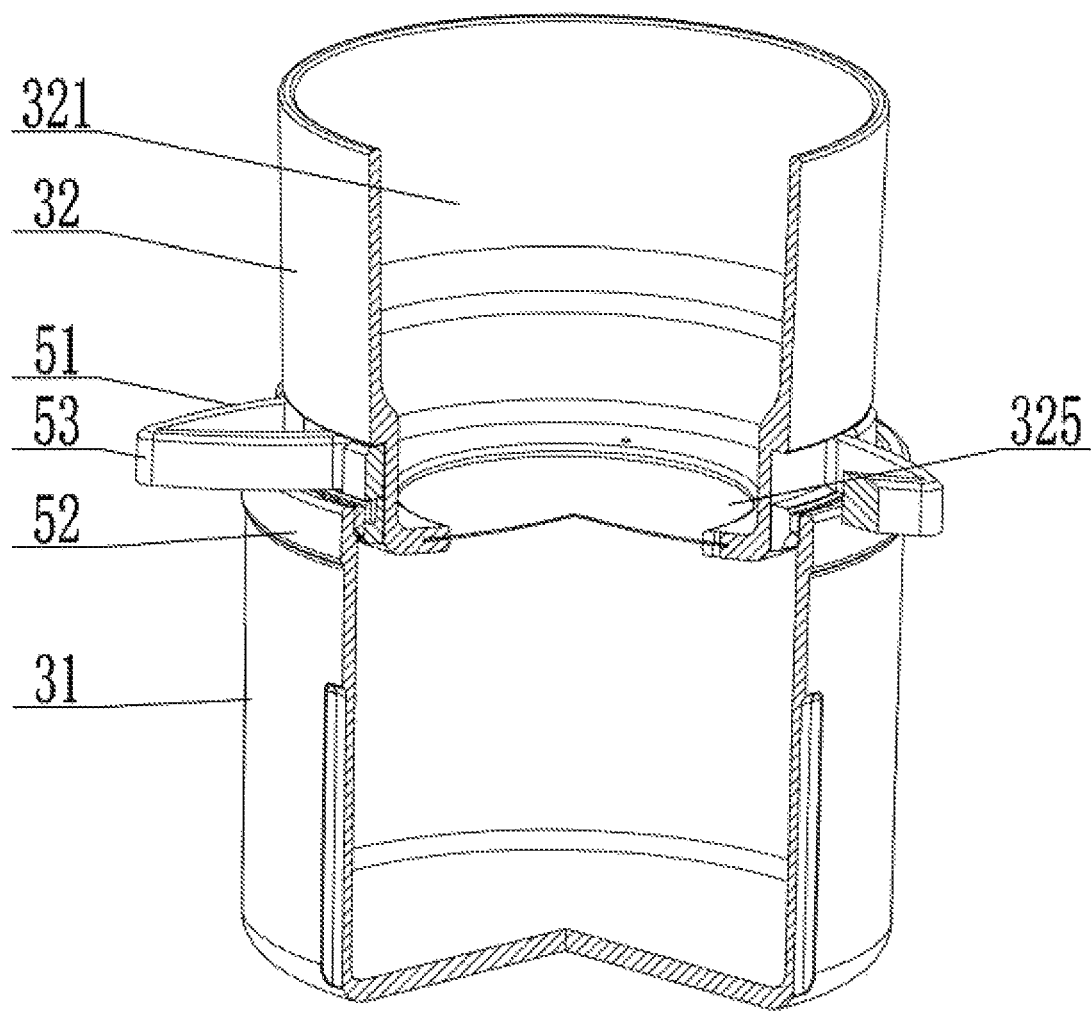
FIG. 7 is a cross-sectional diagram of a folding supporting component according to the present invention when being at the supporting position.
Figure 8:
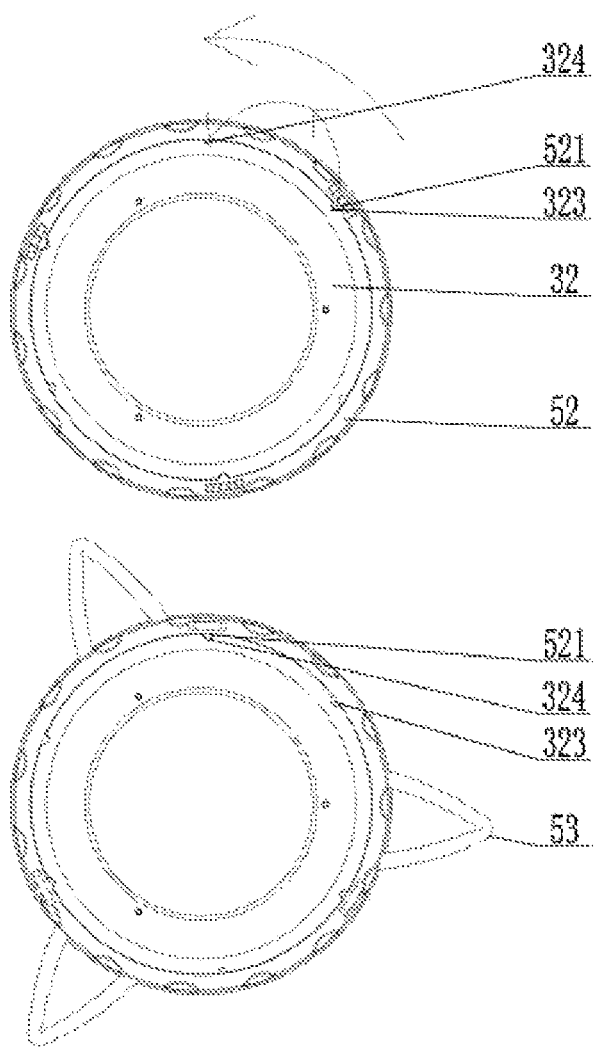
FIG. 8 is a schematic diagram of the rotating state of a filtering mesh cover according to the present invention.
Figure 9:
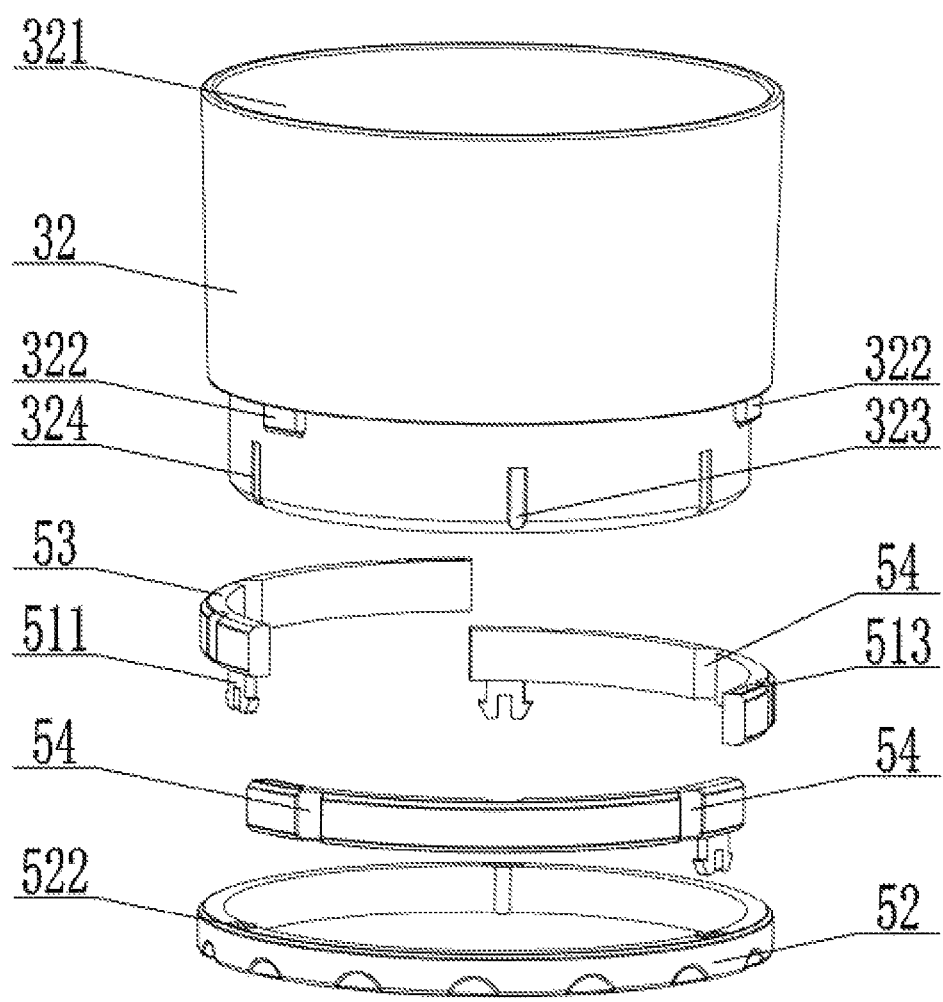
FIG. 9 is an exploded diagram of a filtering mesh cover according to the present invention.

When the user needs to drink beverages outside, the bottom cover 31 can be rotated to disengage the strip-shaped ribs 311 on the bottom cover 31 from the point-shaped protrusions 22 at the lower part of the cup body 2, thereby removing the bottom cover 31 from the lower part of the cup body 2. Then, the filtering mesh cover 32 and the built-in accommodating cup 33 are taken out in sequence. Then, the beverage that needs to be brewed is taken out from the inner compartment body 332 of the built-in accommodating cup 33, the beverage packaging is torn, and the beverage is put into the cup cover component 1 for brewing. Then, the folding supporting component 5 of the filtering mesh cover 32 is adjusted from the accommodating position to the supporting position, so that the filtering mesh cover 32 is supported on the mouth of the bottom cover 31. The specific operation is that the user rotates the rotating ring 52, and the rotating ring 52 drives the other end of the folding bracket 51 to rotate. Meanwhile, the bending auxiliary groove 54 bends and folds inwards. The bending part 53 on the folding bracket 51 is bent by the acting force of the rotating ring 52 and the auxiliary function of the bending auxiliary groove 54, so that the folding bracket 51 is slowly folded. When the user rotates the rotating ring 52 until the limiting rib 521 provided inside the rotating ring 52 is clamped into the second limiting slot 324, the folding bracket 51 forms a supporting position as shown in FIG. 6. Then, the user place the filtering mesh cover 32 on the bottom cover 31 through the bent folding bracket 51. At this time, the bent folding bracket 51 extends out of the mouth of the bottom cover 31, so that the filtering mesh cover 32 can be stably supported at mouth of the bottom cover 31. After the beverage is brewed, the user pours the liquid in the cup cover component 1 into the third accommodating space 321 of the filtering mesh cover 32, and the liquid is filtered through the filtering mesh member 325. The liquid flows into the bottom cover 31 along the filtering mesh member 325, and other solids, impurities, etc. will be left in the third accommodating space 321 of the filtering mesh cover 32 to complete the filtering of the beverage. After the filtration is completed, the filtering mesh cover 32 is removed, and the user can directly drink the beverage in the bottom cover 31 at this time.

Figure 4:
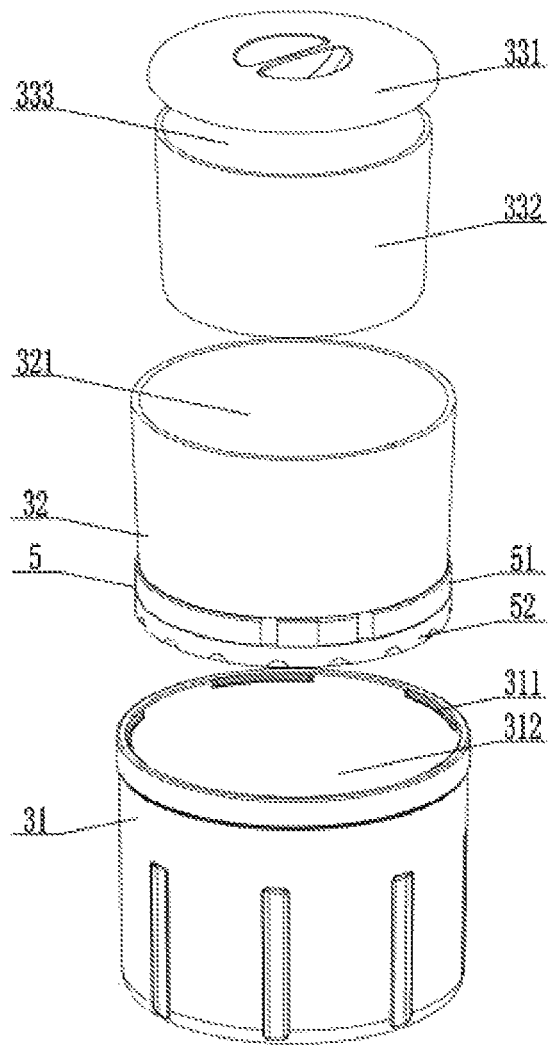
FIG. 4 is an exploded diagram of a bottom cover component according to the present invention.
Figure 5:
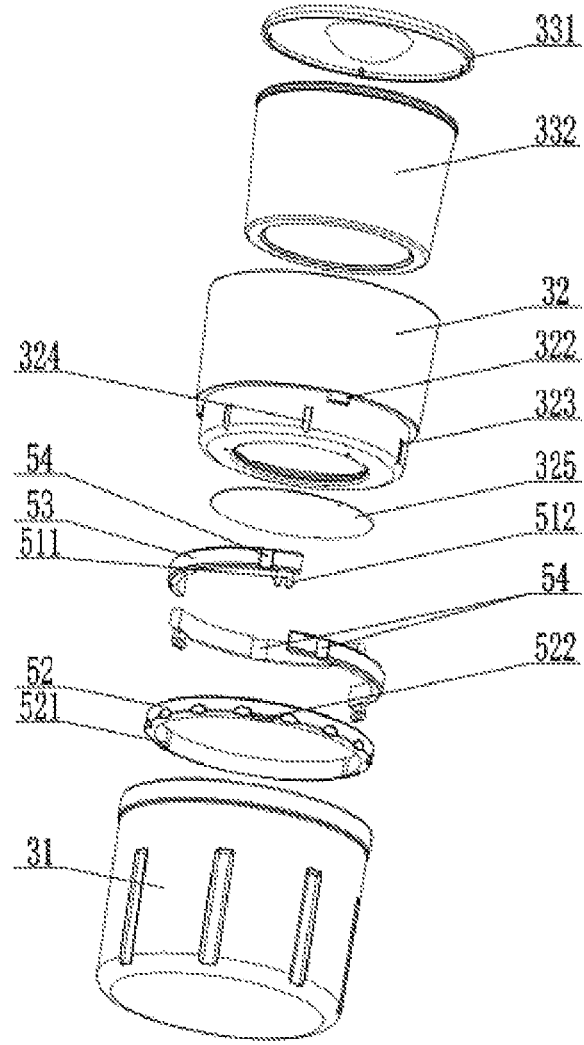
FIG. 5 is a second exploded diagram of a bottom cover component according to the present invention.

After the user finishes drinking, the folding supporting component 5 of the filtering mesh cover 32 is adjusted from the supporting position to the accommodating position. Specifically, the user rotates the rotating ring 52 in the opposite direction, so that the rotating ring 52 drives the other end of the folding bracket 51 to rotate in reverse. At the same time, the bending auxiliary groove 54 also gradually expands outwards so that the bending part 53 on the folding bracket 51 expands to both sides, and then the folding bracket 51 slowly returns to its original position. When the user rotates the rotating ring 52 until the limiting rib 521 provided in the rotating ring 52 is clamped into the first limiting slot 323 on the filtering mesh cover 32, the folding bracket 51 is at the accommodating position as shown in FIG. 4. At this time, the bending part 53 on the folding bracket 51 will be in contact with the filtering mesh cover 32 tightly. In this case, the user can place the filtering mesh cover 32 into the second accommodating space 312 of the bottom cover 31, and place the built-in accommodating cup 33 in the third accommodating space 321 of the filtering mesh cover 32. After finishing placing, the bottom cover component 3 is integrally connected to the lower part of the cup body 2 through the strip-shaped ribs 311 and the point-shaped protrusions 22, and then the inner plug component 4 and the cup cover component 1 are mounted back to the original position, and the drinking container can be placed back in the bag.

In summary, the above description is only a preferred embodiment of the present invention, and all equivalent changes and modifications made within the scope of the patent application of the present invention shall fall within the scope of the present invention.

What is claimed is:

1. A drinking container with a filtering cover, comprising a cup cover component, an inner plug component, a cup body, and a bottom cover component, wherein a first accommodating space is formed in the cup body, the inner plug component is connected with the cup body and seals the first accommodating space, the cup cover component is connected with the cup body, the bottom cover component is connected to the lower part of the cup body, wherein the bottom cover component comprises a bottom cover and a filtering mesh cover, a second accommodating space is provided in the bottom cover, the filtering mesh cover is placed in the second accommodating space, a third accommodating space is provided in the filtering mesh cover, a filtering mesh member communicated with the third accommodating space is provided on the filtering mesh cover, the filtering mesh cover is rotatably connected with a folding supporting component and forms an accommodating position and a supporting position by rotating the folding supporting component, at the supporting position, the folding supporting component expands outward and supports the filtering mesh cover, and at the accommodating position, the folding supporting component contracts inward and is accommodated on the filtering mesh cover.

2. The drinking container with a filtering cover according to claim 1, wherein: the folding supporting component comprises at least two folding brackets and a rotating ring, the rotating ring is rotatably connected to the filtering mesh cover, one end of the folding bracket is connected to the side wall of the filtering mesh cover, and the other end of the folding bracket is connected to the rotating ring, a bending part is provided on the folding bracket, the rotating ring drives the other end of the folding bracket to slide to form the accommodating position and the supporting position during rotation, when the folding bracket is at the supporting position, the bending part expands outward and supports the filtering mesh cover, and when the folding bracket is at the accommodating position, the bending part contracts inwardly and is accommodated on the filtering mesh cover.

3. The drinking container with a filtering cover according to claim 2, wherein: one end of the folding bracket is provided with a connecting hole, a connecting rib cooperated with the connecting hole is provided at the side wall of the filtering mesh cover, and one end of the folding bracket is connected to the filtering mesh cover through the connecting hole and the connecting rib.

4. The drinking container with a filtering cover according to claim 2, wherein: the other end of the folding bracket is provided with a clamping protrusion, a neck cooperated with the clamping protrusion is provided on the rotating ring, a barb is provided at the bottom of the clamping protrusion, the barb is clamped into the inner wall of the neck, and the other end of the folding bracket is connected to the rotating ring through the neck and the clamping protrusion.

5. The drinking container with a filtering cover according to claim 2, wherein the bending part is further provided with a bending auxiliary groove.

6. The drinking container with a filtering cover according to claim 5, wherein the number of the bending auxiliary grooves is three, wherein one bending auxiliary groove is located inside the middle part of the bending part, and the remaining two bending auxiliary grooves are located outside the end of the bending part.

7. The drinking container with a filtering cover according to claim 2, wherein: a limiting rib is provided inside the rotating ring, the filtering mesh cover is provided with a first limiting slot and a second limiting slot cooperated with the limiting rib, when the folding bracket is at the accommodating position, the limiting rib is clamped into the first limiting slot, and when the folding bracket is at the supporting position, the limit rib is clamped into the second limiting slot.

8. The drinking container with a filtering cover according to claim 1, wherein the number of the folding brackets is three.

9. The drinking container with a filtering cover according to claim 1, wherein strip-shaped ribs are provided on the inner wall of the bottom cover, the number of the strip-shaped ribs is at least two, the strip-shaped ribs are uniformly distributed on the inner wall of the bottom cover, point-shaped protrusions cooperated with the strip-shaped ribs are provided in the lower part of the cup body, and when the bottom cover is connected to the cup body, the point-shaped protrusions are located below the strip-shaped ribs and limit the bottom cover to move up and down.

10. The drinking container with a filtering cover according to claim 1, wherein the bottom cover component further comprises a built-in accommodating cup, the built-in accommodating cup is placed in the third accommodating space, the built-in accommodating cup comprises an inner compartment body and an inner compartment cover, a fourth accommodating space is formed in the inner compartment body, and the inner compartment cover covers the inner compartment body.

\* \* \* \* \*